US005800900A

United States Patent [19]

Mitchell

[11] Patent Number: 5,800,900

[45] Date of Patent: Sep. 1, 1998

[54] DECORATIVE ATTACHMENTS FOR ARTICLES OF CLOTHING AND FOOTWEAR

[76] Inventor: Lawrence E. Mitchell, 52 Beaman Rd. East, Rochester, N.Y. 14624

[21] Appl. No.: 640,664

[22] Filed: May 1, 1996

[51] Int. Cl.$^6$ .................... B32B 7/06

[52] U.S. Cl. .................... 428/100; 428/99; 40/636; 2/244; 2/245; 2/912; 36/136

[58] Field of Search .................... 428/67, 100.99; 40/636, 626, 631, 625; 2/244, 245, 246, 912; 36/136, 137

[56] References Cited

U.S. PATENT DOCUMENTS

| | | | |
|---|---|---|---|
| 2,589,409 | 3/1952 | Leichter | 2/244 |
| 2,801,477 | 6/1957 | Adams et al. | 36/2.5 |
| 4,516,337 | 5/1985 | Adamik | 40/636 |
| 4,621,441 | 11/1986 | Wagner et al. | 36/136 |
| 4,837,960 | 6/1989 | Skaja | 40/636 |
| 4,852,276 | 8/1989 | Savoca et al. | 40/636 |
| 5,331,753 | 7/1994 | Rodibaugh | 40/636 |

*Primary Examiner*—Alexander Thomas
*Attorney, Agent, or Firm*—Cumpston & Shaw

[57] ABSTRACT

The present invention relates to articles of clothing and footwear and more particularly to an insertable patch or emblem which fits under the overlapping layer of a pocket formed in the article of clothing or footwear. The patch or emblem and the pocket in the article include releasable attachment means.

1 Claim, 3 Drawing Sheets

DECORATIVE ATTACHMENTS FOR ARTICLES OF CLOTHING AND FOOTWEAR

FIELD OF THE INVENTION

This invention generally relates to articles of clothing and footwear, and more particularly to the attachment of decorative patches to articles of clothing and footwear.

BACKGROUND OF THE INVENTION

Ornamental designs and decorative emblems are very popular and commonly found on articles of clothing and footwear, such as sneakers, sandals or shoes. Many people purchase articles of clothing or footwear that have favorite emblems or logos attached to them. Many people, particularly sports fans, tend to purchase many articles of clothing having the decal or logo of their favorite athletic team attached thereto. Teenagers and children, in particular, tend to purchase multiple articles with differing logos and emblems. Clothing that displays emblems, logos, favorite cartoons, sports teams, NASCAR racers or schools is in fashion. The accumulation of clothing and footwear with favorite logos and decals attached thereto becomes prohibitively expensive and space-consuming. The expenses for the clothing become astronomical and therefore limit the amount of articles which may be purchased.

If an individual desires to have differing emblems on different articles of clothing and footwear, the individual must purchase a variety of clothing and footwear at considerable expense. Therefore, there is a need for a interchangeable decorative patch or emblem for an article of clothing or footwear which is inexpensive, convenient, and aesthetically pleasing. The present invention enables an individual to interchange his/her favorite decals with different articles of clothing and footwear. The wearer is able to show enthusiasm for a favorite sports team with logos that are easily applied and removed, enabling one to change the appearance of the clothing or footwear as desired.

SUMMARY OF THE INVENTION

The present invention is an apparatus for attaching a decorative patch or emblem to an article of clothing or footwear comprising a pocket on the article including a backing layer and a surface layer overlaying the backing layer, the surface layer having an opening overlapping the backing layer to form a peripheral pocket therebetween; and a decorative patch having a periphery larger than the opening.

DETAILED DESCRIPTION OF THE INVENTION

Figure 1:
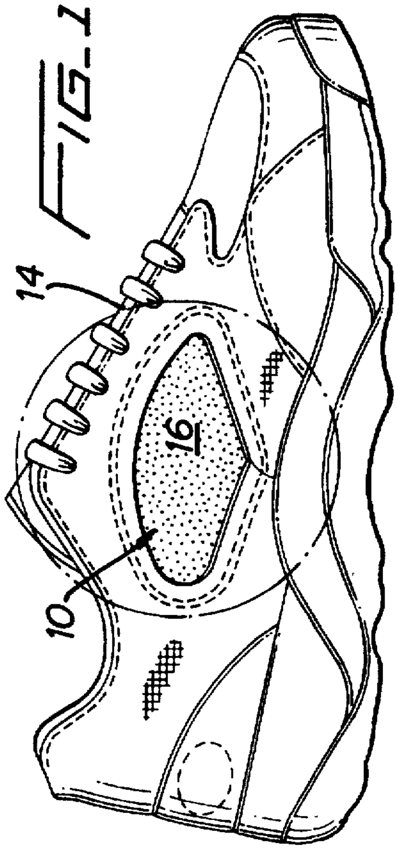
FIG. 1 is a side view of the apparatus according to the present invention.
Figure 2:
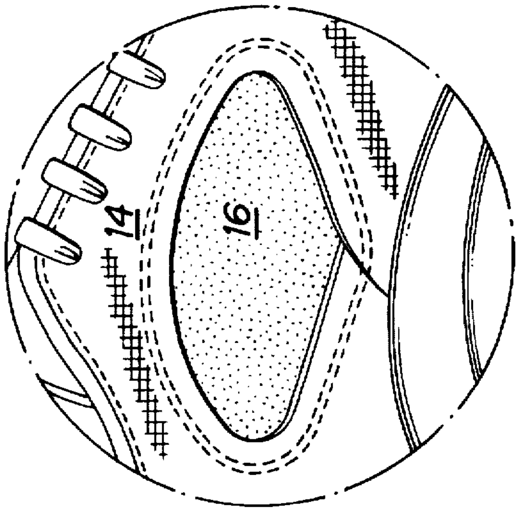
FIG. 2 is an enlarged view of FIG. 1 taken along Lines 4—4.
Figure 5:
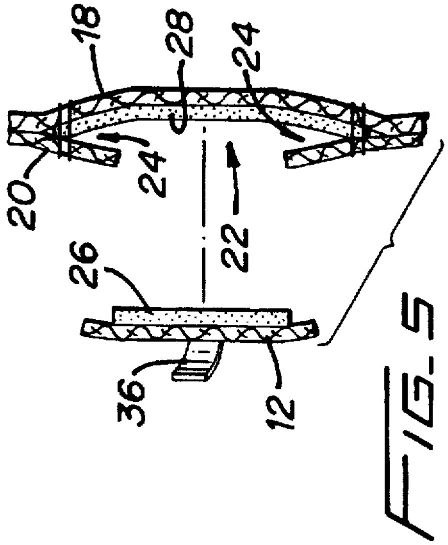
FIG. 5 is a cross sectional view of the patch and the pocket.

For illustrative purposes only, the present invention will be described in detail with regard to a decorative patch for footwear, specifically a sneaker. As shown in FIGS. 1, 2 and 5, the apparatus 10 for attaching a decorative patch 12 to an article of clothing or footwear 14 comprises a pocket 16 on the article 14 which includes a backing layer 18 and a surface layer 20 overlaying the backing layer 18. The surface layer 20 has an opening 22 overlapping the backing layer 18 to form a peripheral pocket 24 therebetween. Preferably, the decorative patch 12 has a periphery larger than the opening 22 and is slightly larger than the pocket 16 to form a snug fit. The decorative patch or emblem 12 has a first releasable attachment 26 on the patch 12. A cooperating releasable attachment 28 is affixed on the pocket 16 for securing the patch 12 in the pocket 16. The first releasable attachment 26 is allocated to the backing layer 18 while a cooperating releasable attachment 28 is on the patch or emblem 12. The backing layer 18 also comprises a releasable attachment 26. Preferably, the releasable attachment 26, 28 comprises hook fasteners and loop fasteners, commonly referred to by its trademark Velcro. However, the releasable attachments 26, 28 may comprise snaps, closures, magnets or other appropriate attachment means, as shown in FIGS. 5, 6, 7, and 8.

Figure 4:
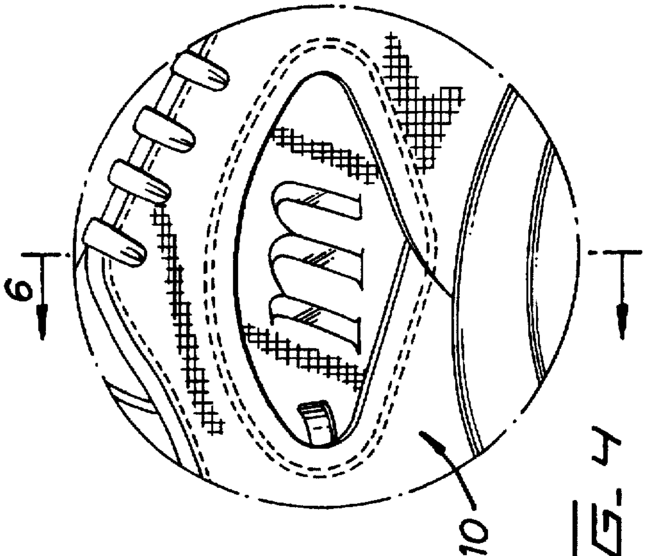
FIG. 4 is an enlarged view of FIG. 1 showing the patch inserted in the pocket.

The surface layer 20 of the article 14 has an opening 22 which overlaps the backing layer 18, providing a sufficient amount of pressure to frictionally hold the patch 12 in the opening 22. As shown in FIGS. 1, 2, and 4, the pocket 16 is preferably created in a non-stress area of the article of clothing or footwear 14. The position of the pocket 16 and opening 22 in such a non-stress area allows the structure of the article 14 of clothing or footwear to be maintained and helps minimize the disturbance of the patch 12. The preferred dimensions of the pocket 16 formed in the article 14 has a depth in the approximate range of ⅛th to 3/16th inch and the overlap dimension of the surface layer 20 is in the approximate range of ⅛th to ½ inch.

Figure 9:
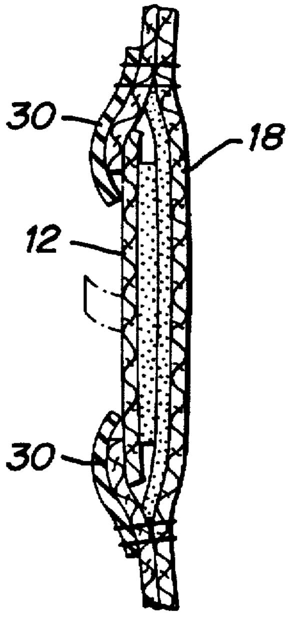
FIG. 9 is a further alternative embodiment.

In an alternative embodiment illustrated in FIG. 9, the peripheral opening 22 may also include an elastic rim 30. The elastic rim 30 is preferably attached to the surface layer 20 and allows a tight fit between the patch 12 and the surface layer 20 while also allowing the flexibility of the overlapping surface layer 20.

Figure 3:
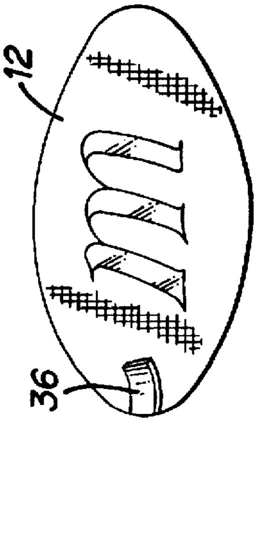
FIG. 3 illustrates a patch.
Figure 6:
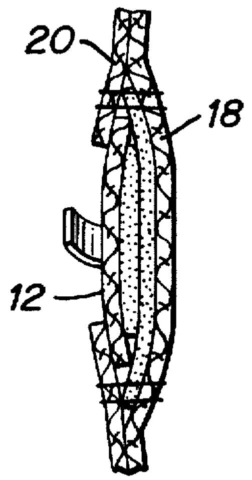
FIG. 6 is a cross sectional view of the patch inserted within the pocket of the article.
Figure 7:
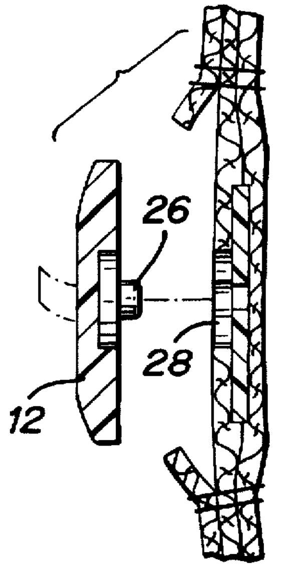
FIG. 7 is an alternative embodiment.
Figure 8:
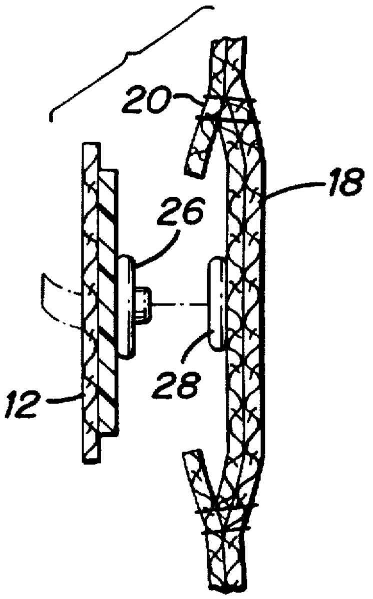
FIG. 8 is another alternative embodiment.

The patch 12 may be comprised of the same material as the article 14 it is to be attached to or a different material to promote the distinctiveness of the patch 12 itself. The patch 12 may be comprised of leather, cloth, rubber, elastomer plastic or any suitable material a designer may wish to use. As shown in FIG. 3, the patch 12 may include an illumination means or illuminous material or reflective means 34. Preferably, the patch 12 includes a tab 36 which allows an individual to pull the tab 36 to remove the patch from the pocket 16 in the article 14.

Figure 10:
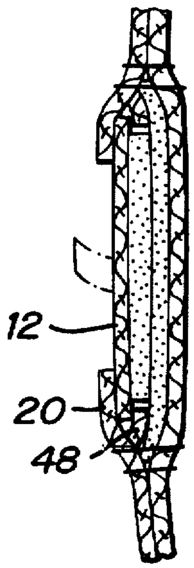
FIG. 10 is a further alternative embodiment.
Figure 11:
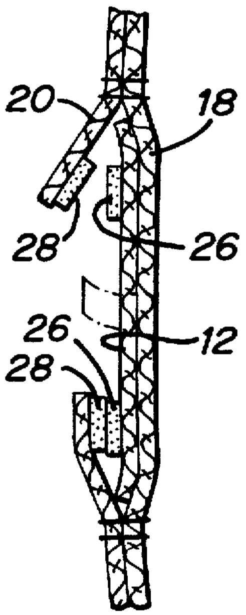
FIG. 11 is a further alternative embodiment.

As illustrated in FIG. 10, the releasable attachment 26 may be positioned on the exterior surface of the patch 12 and the interior surface of the surface layer 20 to frictionally hold the patch 12 in the pocket 16, whereby the frictional fit occurs between the exterior of the patch 12 and the overlapping layer of the surface layer 20.

Figures 12, 12A, 13, 14, 15, 16:
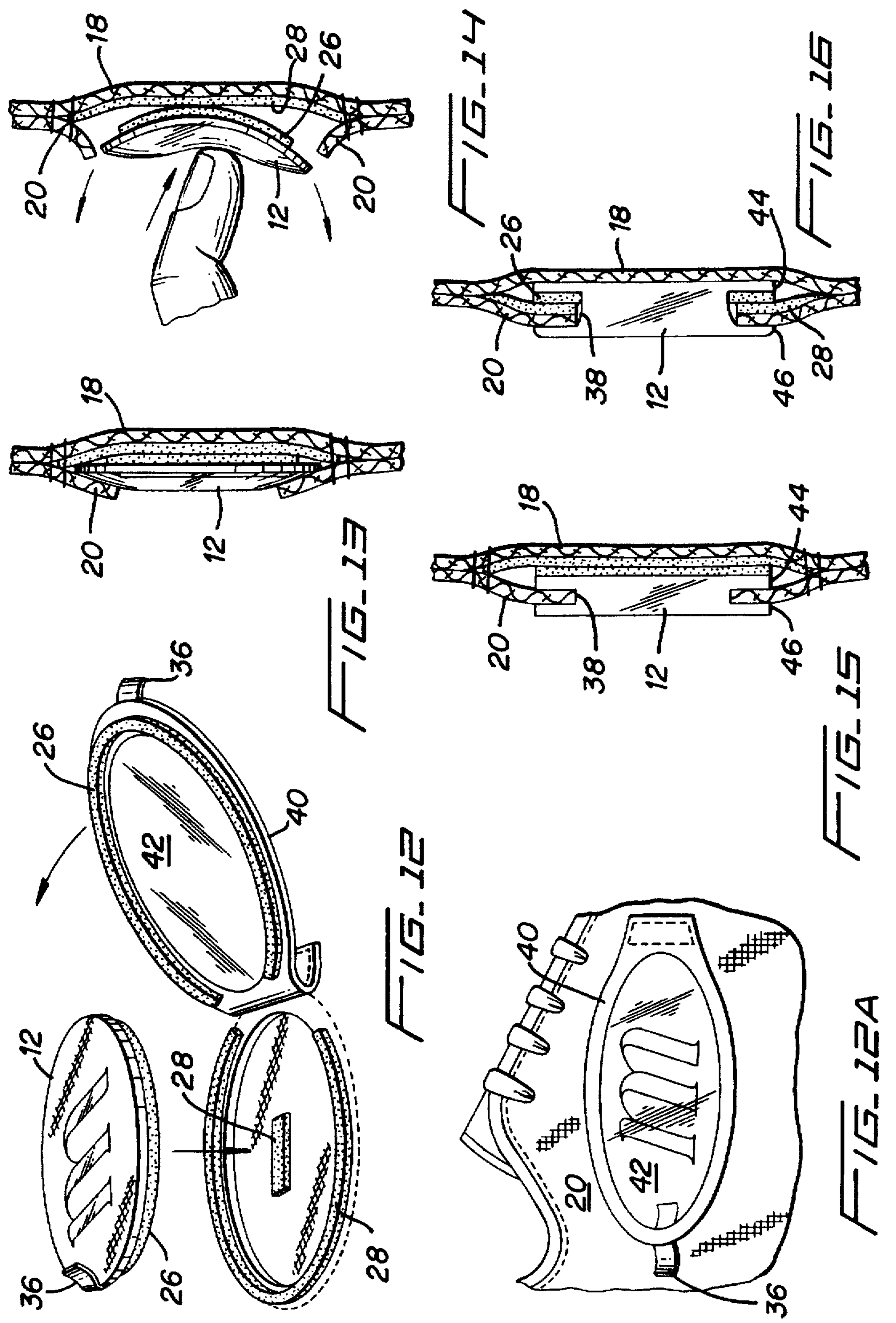
FIG. 12 is a further alternative embodiment showing the strip of material.
FIG. 13 is a further alternative embodiment.
FIG. 14 is a further alternative embodiment.
FIG. 15 is an alternative embodiment.
FIG. 16 is a further alternative embodiment.

In alternative embodiments shown in FIGS. 14 and 15, the patch 12 may include a recess groove 38 in its peripheral surface such that the patch 12 and the surface layer 20 form a tongue and groove frictional fit. That is, a first portion 44 of the peripheral edge of the patch 12 will fit behind the overlapping layer of the surface layer 20 while a second portion 46 of the patch 12 will lay over the overlapping layer of the surface layer 20. The advantage to such a fit would be to securely mount the patch 12 within the opening. The attachment means may be positioned over the entire surface of the back of the patch and the backing layer of the surface layer of the article or may be selectively positioned in the tongue and groove area of the patch 12 and overlapping layer of the surface area 20 as shown in FIG. 16. Alternatively, the surface layer 20 may include a recess groove 48 such that a portion of the patch 12 sits within the recess groove 48, as shown in FIG. 10.

In an additional embodiment shown in FIG. 12, the apparatus 10 further comprises a strip of material 40, having a releasable attachment 26 located on its interior surface and having a cooperating releasable attachment 28 on its exterior surface, fixedly attached to the article 14 at one location along a periphery of the strip of material 40 and removeably attached along a remainder of the periphery. A patch 12 may be removeably positioned between the strip of material 40 and the article 14. The strip of material 40 may include a cover 42, preferably clear, which covers the patch in its desired position.

In a further embodiment shown in FIGS. 13 and 14, the patch 12 may be a hard plastic material which may be popped into the pocket 16 and inserted underneath the overlapping layer of the surface layer 20. The hard plastic material may than be removed by forcibly pressing the hard material at its center point to release the peripheral edge of the hard material from engagement with the article 14.

Further, the patch 12 may comprise a running light or reflective material which can be inserted into the pocket 16 on the article 14 to provide illumination or safety measures for joggers, little children, bicyclists, or anyone with a concern for safety.

Various changes and modifications may be made within the preview of this invention as will be readily apparent to those skilled in the art. Such changes and modifications are within the scope and teaching of this invention as defined by the claims pended thereto.

What is claimed is:

1. An apparatus for attaching a decorative patch to an article comprising:

(a) a pocket on the article including a backing layer and a surface layer overlaying the backing layer, the surface layer having an opening overlapping the backing layer to form a peripheral pocket therebetween;

(b) a patch having a periphery larger than the opening; and (c) a layer of hook and loop fasteners attached to the surface layer and the exterior surface of the patch.

* * * * *